No. 702,446. Patented June 17, 1902.
J. B. MAHANA & W. P. ELY.
VOTING MACHINE.
(Application filed July 22, 1901.)
(No Model.) 4 Sheets—Sheet 1.

Fig. 1.

Witnesses
C. H. Walker.
Charles L. Howard.

Inventors
John B. Mahana,
William P. Ely,
by W. T. Howard, Attorneys.

THE NORRIS PETERS CO., PHOTO-LITHO., WASHINGTON, D. C.

No. 702,446. Patented June 17, 1902.
J. B. MAHANA & W. P. ELY.
VOTING MACHINE.
(Application filed July 22, 1901.)
(No Model.) 4 Sheets—Sheet 3.

Witnesses
Inventors

No. 702,446. Patented June 17, 1902.
J. B. MAHANA & W. P. ELY.
VOTING MACHINE.
(Application filed July 22, 1901.)
(No Model.) 4 Sheets—Sheet 4.

WITNESSES:
C. H. Walker.
Charles L. Howard.

INVENTORS
John B. Mahana,
William P. Ely,
BY
Attorneys.

UNITED STATES PATENT OFFICE.

JOHN B. MAHANA AND WILLIAM P. ELY, OF KELSO, WASHINGTON.

VOTING-MACHINE.

SPECIFICATION forming part of Letters Patent No. 702,446, dated June 17, 1902.

Application filed July 22, 1901. Serial No. 69,292. (No model.)

*To all whom it may concern:*

Be it known that we, JOHN B. MAHANA and WILLIAM P. ELY, of Kelso, in the county of Cowlitz and State of Washington, have invented certain new and useful Improvements in Automatic Voting-Machines; and we do declare that the following is a full, clear, and exact description of the invention, which will enable others skilled in the art to which it appertains to make and use the same.

This invention relates to improvements in automatic voting-machines, by means of which either a "straight" or "mixed" ticket may be voted and the total votes for each candidate be registered.

The invention relates, further, to means whereby a portion only of the officers usually voted for may receive votes, as in the case of special elections or in municipal or county elections.

The invention further relates to means whereby the voting-keys when once depressed by the person voting will be locked and will remain in such a locked condition until the voter leaves the voting-booth, whereupon the keys will be automatically unlocked.

The invention relates to that type of voting-machine wherein the votes are cast by the depression of fulcrumed levers arranged, preferably, on the basis of one to a candidate. In the present invention each of these keys carries a tally or totalizing mechanism which will register the number of depressions of the key. The indices of the tally are normally covered and are hidden from the sight of the voter by means of a locked plate or shutter, which can be opened by the proper officers only. The keys are fulcrumed upon a vertical board or frame supported within the voting-booth. The keys are arranged in horizontal rows, one row carrying keys which represent candidates for a certain office to be voted for. The keys are fulcrumed upon vertical axes or shafts. It is intended that there be as many vertical shafts as there are political parties represented by candidates. Each shaft is provided with a crank or equivalent device, by means of which it may be given a partial rotation, and thus all the keys in one vertical column will be simultaneously depressed and all the candidates of one political party will receive one vote, which will be registered by the several tallies carried by the keys.

The use of the device may be greatly extended by interrupting each shaft adjacent to its center and allowing the two halves to be independently rotated when so desired. The actuating-cranks may be so arranged as to turn both shaft parts simultaneously or either half, as may be necessary. This arrangement will be of use when there is a vote for but a portion of the offices usually voted for—as, for instance, in municipal elections.

To prevent a voter depressing the same key more than once, a lock is provided which will automatically engage with a hook carried by each key. This lock will be disengaged by the voter leaving the booth. The mechanism for accomplishing this consists of a pivoted footboard, upon which the person stands while voting. The lock is connected to the movable extremity of the footboard through the intermediary of suitable mechanism, which will be described in the sequel. The release of the lock may actuate a register which can be attached to the outside of the booth, and will thus serve to indicate the number of persons who have voted. A gong may be rung by the same mechanism and will audibly indicate when the booth is emptied.

To prevent more than one candidate being voted for by the same person, each key is provided with an "interfering-finger," which upon the key being depressed will enter an opening in a second lock-bar and move the same to one side. The two sets of lock-bars are superposed and are mounted in ways below and parallel to each horizontal line of keys. The opening below each interfering-finger is restricted in size, so that upon the bar being shifted by the depression of a key the remaining keys cannot be depressed, as each interfering-finger will come in contact with a solid portion of the lock-bar. To prevent two or more keys being simultaneously depressed, the several interfering-fingers of each horizontal line of keys are arranged at different relative angles or are curved or are otherwise rendered irregular, so that upon a number simultaneously entering their openings in the lock-bar the keys will become locked and rendered immovable.

To allow of a single vote being cast without affecting the other keys pivoted to the same shaft, the several keys are attached to their supporting-shafts by a pawl-and-ratchet mounting, so that they may be depressed without rotating the shaft. The shaft, however, upon being rotated will depress all the keys unless their pawls be disengaged from the ratchets.

To allow of a vote being cast for a certain candidate by the depressing of a single lever and to complete the vote by depressing the keys representing all the other offices on another ticket by the rotating of a crank, causing the simultaneous depression of all the keys upon the particular shaft except the key which represents the same office for which a vote has been already cast by the depression of the single key, it is necessary that the key on the same horizontal line which represents a candidate for the same office be disconnected from the supporting-shaft, so that it will not be depressed upon the rotation of the latter. To accomplish this, the pawls which transmit motion from the shafts to the keys are arranged to be automatically disengaged upon the depression of any one key on the same horizontal line. This is accomplished by a series of suitable connecting-levers actuated by the movement of either of the before-mentioned locking-bars.

Additional keys may be added for registering the votes of special subjects, such as constitutional amendments, appropriations, borrowing of money, &c. As these are not to be actuated by the shafts, they will be loosely journaled on the supporting-shafts and will not have the pawl, but will have the interfering-finger and the release mechanism.

In order to better understand the nature of the invention, attention is directed to the accompanying drawings, in which—

The following description follows closely the device as is illustrated in the drawings. It goes without saying that the device may be shifted end for end, causing that mechanism which now appears upon one side of the machine to be on the other side. Furthermore, the number of keys is immaterial. The apparatus may be enlarged or reduced without departing from the spirit of our invention.

Figure 1:
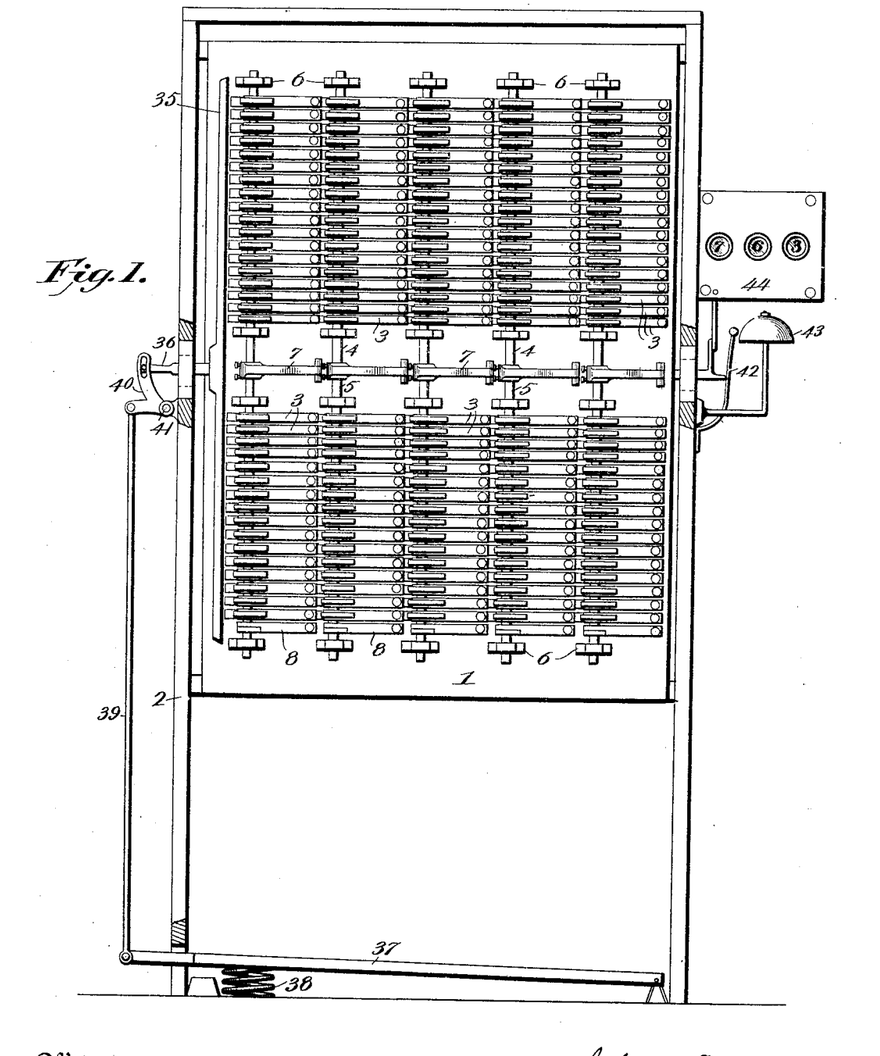
Figure 1 is a front view of our device as it will appear when located within a booth.

*The general features of the apparatus.*—As shown in Fig. 1, the foundation of the device consists of a base or board 1, supported in a vertical position at a convenient height above the floor within a frame 2. This frame 2 may be supported within the voting-booth or may form a part thereof. The voting-keys 3, each of which carries tally mechanism which is actuated by its depression, are arranged upon the basis of one for each and every candidate who is to be voted for. The keys are arranged in horizontal rows upon the vertical supporting shafts 4 and 5, formed in two pieces. It is to be understood that all of the keys upon the same horizontal line represent candidates for the same office, while those in the same vertical column represent candidates of the same political party.

Figure 2:
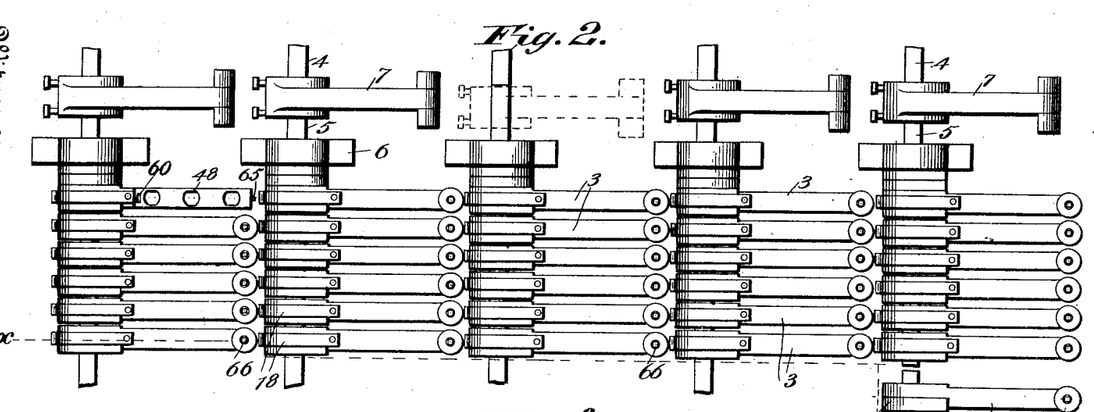
Fig. 2 is a front view, enlarged, of a portion of the actuating mechanism with the base removed, showing several voting-keys and actuating-shafts.

The shafts 4 and 5 are mounted in suitable bearings 6, so that they may be given a partial revolution by the actuation of a proper crank 7. Each of the cranks 7 is shown in Fig. 2 as being clamped over the abutting ends of the shafts 4 and 5. By this means both shafts in a pair may be simultaneously oscillated by the movement of the crank 7. By shifting a crank beyond the joint and attaching it to either of the shafts 4 or 5 but one shaft will be oscillated by the movement of the crank. This peculiar construction will be useful when for any reason it is desired to cut out or render inactive the voting mechanism either above or below the center of the base. We prefer in practice to have the voting-keys for State and national offices in the upper half of the frame and the keys for county and municipal offices in the lower half.

In the lower part of the frame may be arranged a series of a form of slightly-modified keys 8, used for the purpose of registering a special vote.

Figure 3:
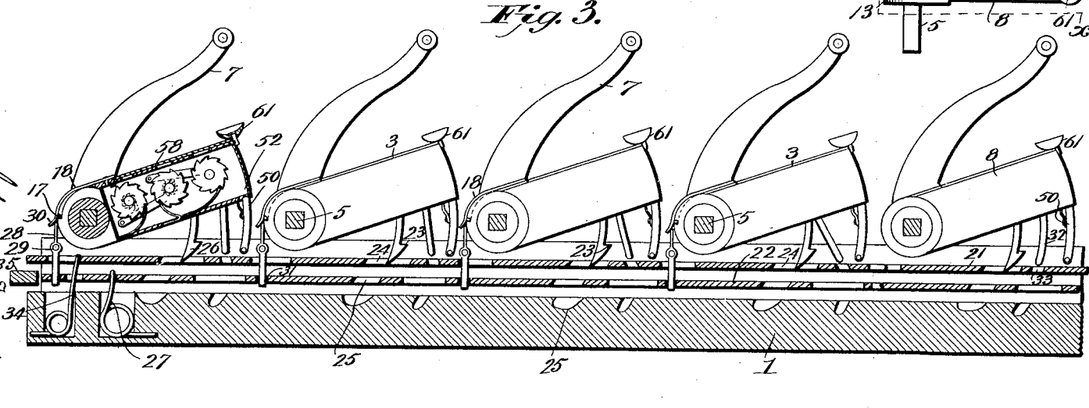
Fig. 3 is a side sectional view thereof on the line $x\,x$ of Fig. 2.
Figure 9:
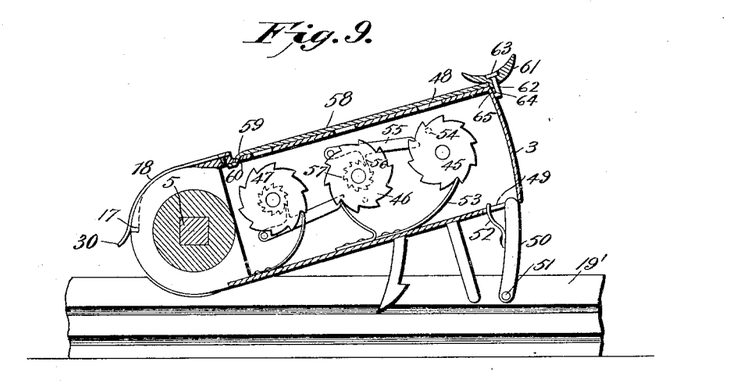
Fig. 9 is an enlarged sectional view of a key, showing the tally mechanism therefor.
Figure 10:
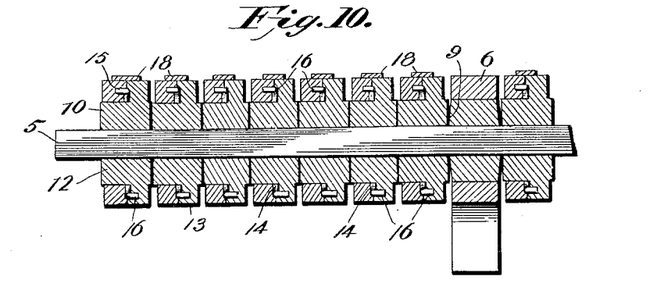
Fig. 10 is a sectional view of a rock-shaft, several key-supporting bushings, and an intermediate shaft-support.

*The voting-keys and their mountings.*—The construction and arrangement of the voting-keys and their supporting-shafts is shown in Figs. 2 and 3 and in detail in Figs. 9 and 10. The shafts 4 and 5 are square in cross-section. Each, as before described, is mounted in a suitable supporting-bracket 6, arranged at either extremity or intermediate thereof, as may be necessary. Each bracket contains a suitable bushing 9, through which the shaft passes and which is free to rotate in the bracket.

Figure 11:
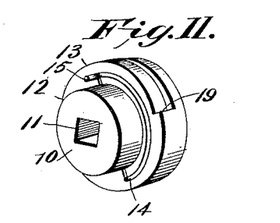
Fig. 11 is a perspective view of a key-supporting bushing and the retracting-spring therefor.

The keys 3 are fulcrumed each upon a bushing 10, (see Figs. 10 and 11,) provided with a square hole 11 through the center for the passage of the shaft. The cylindrical collar portion 12 of the bushing has a bearing for the key 3 and an enlarged flange or collar 13. As is shown in Fig. 10, a series of bushings 10 and keys 3 may be assembled upon a shaft 5 or 4 and, engaging together, will be retained in position.

In order to normally elevate all of the keys, each is provided with a spring 14, one extremity of which engages at 15 with a portion of the key and the other with the collar portion 13 of the bushing. Upon the key being depressed, the shaft remaining stationary, the spring will be expanded and kept in tension, constantly exerting a lifting force upon the depressed key.

In order that a key may be depressed by the rotation of its supporting-shaft, each key is provided with a pawl 17, supported upon a spring 18 and engaging with a ratchet 19, cut in the periphery of the flange 13 of the supporting-bushing 10. It will be evident that a key may be depressed, which will cause the pawl to ride up the inclined bottom of the ratchet, but that upon a shaft being rotated in the proper direction all of the keys thereon will be depressed.

*The key-lock mechanism.*—Mounted below the keys are a series of horizontal battens 19', each provided with two superposed grooves 20, forming ways for the locking-bars 21 22. These bars are free to slide in a horizontal direction and are arranged accurately below each horizontal line of keys. The keys when depressed are locked in such position by means of the hooks 23, one attached to the bottom of each key. These hooks pass through elongated openings 24 in the bar 21 and engage within smaller openings 25 in the bar 22 and lock behind the back thereof. Each hook 23 has an inclined forward edge 26, which engages with the forward edge of the opening 25 as the key is depressed and bodily moves the locking-bar 22 to the right against the tension of the spring 27. The hook 23, passing below the opening 25, will permit the spring to retract the bar a short distance, thus effectively locking the key in a depressed position.

*The disengaging mechanism.*—To disengage all of the remaining keys from their supporting-shafts when one key in the same horizontal line has been depressed, means is provided for elevating all of the pawls 17 from the ratchets 19, connected with keys on that line. This is accomplished by means of a series of small levers 28, one to a key, pivoted at 29 between adjacent battens 19'. The upper portion of each lever 28 engages with an offset portion 30 of the spring 18. The lower portion of the lever engages with a small opening 31 in the bar 22 immediately below it. A key being depressed and by such action moving the bar 22 to the right, the movement of the bar will oscillate all of its engaging levers 28 and disengage all of the pawls 17 above in the same horizontal line.

The special-vote keys 8 do not have the pawl-and-ratchet mechanism of the others, but do have the locking mechanism and may have the "interfering mechanism" about to be described.

Figures 4, 5:
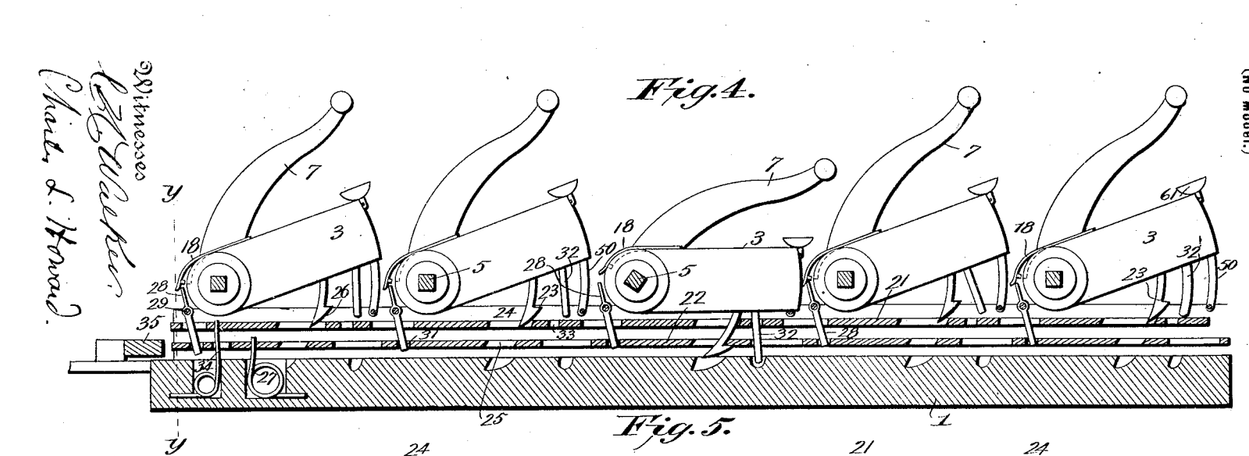
Fig. 4 is a view of the same, but with one key depressed.
Fig. 5 is a top view of the outer locking-bar.
Figure 6:
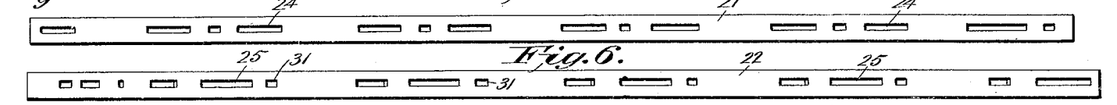
Fig. 6 is a top view of the inner locking-bar.
Figure 7:
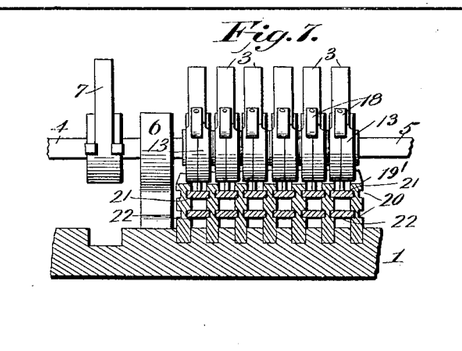
Fig. 7 is an end view, partly in section, taken on the line $y\,y$ of Fig. 4, but with the unlocking-levers removed.
Figure 8:
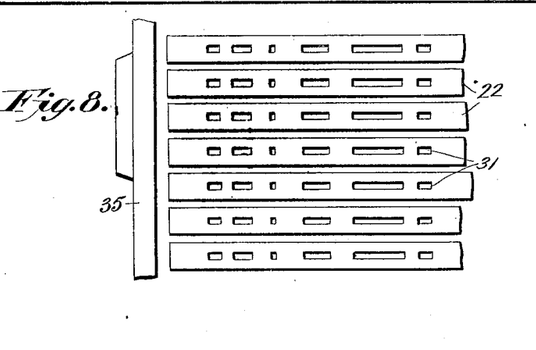
Fig. 8 is a conventional view of a portion of several of the inner locking-bars and of the release-lever therefor.

*The interfering mechanism.*—To prevent more than one lever in the same horizontal line being depressed, each is provided with an interfering-pin 32. All of the pins on the same horizontal line are arranged at different angles or are curved and otherwise rendered irregular, as is shown in Figs. 3 and 4. Below each pin when all in the same line are in the elevated position is an opening 33 of just sufficient size to admit of the passage of the pin 32 therethrough. The pins are so arranged at such an angle that upon the depression of the key they will move the bar 21 to the left against the tension of the spring 34. A single key in the line being depressed will move the locking-bar 21 sufficiently to the left to interpose a solid uncut-away portion below all the other pins in the same line and will effectively prevent these pins with their keys being depressed. The pins being irregularly arranged it will be obvious that the depression of different keys will move the bar 21 at a different speed or distance. Therefore if two or more keys be simultaneously depressed before there can be a sufficient movement to secure an operation of the tally mechanism the pins will lock against the ends of their openings and prevent further depression.

*The unlocking mechanism.*—In order that the keys may be automatically unlocked after a vote has been taken, means is provided for moving all of the locking-bars 22 sufficiently to the right to release the hooks 23 of all the locked keys. This is provided for by means of a bar 35, which may engage with the left-hand extremities of all the lower locking-bars 22. The bar 35 is actuated by a horizontal rod 36, which may pass entirely through the base of the apparatus. This bar is moved by means of a footboard or movable platform, which is normally elevated by means of a spring 38. This footboard is of sufficient size as to render it obligatory for a voter to stand upon it while operating the machine. The footboard connects with the rod 36 through the agency of a pitman 39 and a bell-crank lever 40, the latter being pivoted at 41 to a portion of the frame 2. The free extremity of the rod 36 may engage with the hammer 42 of a gong 43 and may also actuate a register 44. (Shown conventionally in Fig. 1.)

Figure 12:
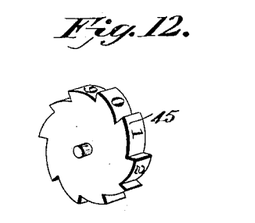
Fig. 12 is a perspective view of one of the tally-wheels.
Figure 13:
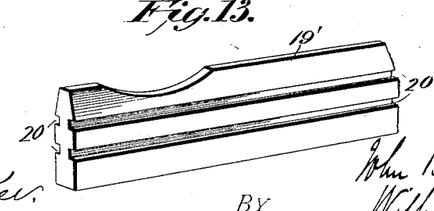
Fig. 13 is a perspective view of one of the supporting-shafts for the locking-bars.

*The tally mechanism.*—Within each key 3 (see Fig. 9) is arranged the register-wheels 45 46 47, each with ten ratchet-teeth having numbers from "0" to "9" upon their faces, as shown in Fig. 12. The numbers may be viewed through openings 48 when the latter are not covered. The tally is actuated by the following mechanism: Below each key 3 and passing through an opening 49 in the bottom thereof is a finger 50, secured by a pivot 51 to a batten 19' immediately below. The finger 50 carries a spring projection 52, which upon the depression of a key will engage with a projecting tooth on the wheel 45 and rotate the same one-tenth of a revolution, a spring 53 preventing retraction. Upon the wheel 45 making one complete revolution a pin 54, carried upon the face thereof, will engage with the free extremity of a pivoted lever 55 and cause a pawl 56 to engage with a ten-toothed ratchet-wheel 57, keyed upon the shaft which supports the wheel 46. This will advance the wheel one-tenth of a revolution. The wheel 47 is intermittently rotated in the same manner from the wheel 46. If necessary, a fourth or fifth tally-wheel may be added, the key 3 being made sufficiently large to contain the addition.

The openings 48, through which the numbers are viewed, are closed by a suitable shutter 58, to which may be attached, if desired, a card bearing the candidate's name, or, if found convenient, the shutter itself may be made of stiff cardboard, upon which is printed the candidate's name. One extremity of the shutter 58 is provided with a lip 59, which passes through a slot 60 in the key 3 and prevents that extremity of the shutter being lifted. The other extremity carries the button 61, which forms a convenient means for depressing the key. Through the button passes a short spindle 62, having an enlarged head 63 at the top and an offset 64 at the bottom. The latter upon the rotation of the spindle may be caused to engage with a projection 65 (see Fig. 2) on the key and will lock the shutter in position. The latter is unlocked by the rotation of the spindle 62 by means of a suitable key, which engages with a square or irregularly shaped opening 66 in the head of the spindle. (See Fig. 2.) The key for fitting this opening will be in the possession of the proper officer only.

*The operation of the complete device.*—The apparatus being assembled, as is shown in Fig. 1, and the levers 7 adjusted so as to oscillate either of the shafts 4 or 5, or both, as depends upon the variety of the election to be held, the device is ready for use. A voter entering the booth must necessarily stand upon the platform 37 and will depress the same, moving the bar 35 to the left. If he wishes to vote the straight ticket, he will actuate one of the levers 7 to depress all of the levers representing candidates for that particular party. These levers being depressed, each will be locked against retraction by means of the hooks 23 carried thereby. During the depression of the levers a spring-finger 52 will engage with a tooth of a wheel 45 in each lever and will rotate the same a tenth of a revolution, which will indicate one vote. This vote, however, may not be seen by a subsequent voter, as the opening 48 will be closed by the shutter 58. Having cast his vote, the voter cannot depress any of the other levers 7, as all of the other keys will be locked against depression by their interfering-pins engaging with the uncut-away portions of the upper lock-bars 21. Should the voter instead of actuating all the keys on the same shaft by means of a lever wish to "split his vote" by depressing keys mounted on other shafts, he may do so by first individually depressing them by means of their buttons 61. Each key when depressed will register such depression upon the tally, will move the lock-bar 21 to the left, the lock-bar 22 to the right, will lock itself against retraction, and will disengage all the other keys on the same horizontal line from their supporting-shafts. The voter, therefore, cannot afterward depress any of the other keys in the same horizontal line. He may complete his vote by depressing keys in the other horizontal lines in the same manner or through the agency of one of the levers 7. It will be seen that the oscillation of the shafts will have no effect upon any of the special vote-levers 8. These must be depressed individually. Having registered his vote, as the voter leaves the booth he steps off the platform 37, which rises by means of the spring 38, and through the agency of the pitman 39 and bell-crank lever 40 the bar 35 is caused to engage with the free extremity of the locking-bars 21, moving them to the right and releasing all of the keys. This action will ring the gong 43, indicating that the booth is empty, and will actuate the register 44. The parts have now assumed their normal position and the booth is ready for another voter. After the total vote has been cast the base 1 may be disconnected from the frame 2 and placed upon a table for greater convenience. One of the levers 7 being given a quarter-turn will partially depress a row of levers and will thus lock all parts and prevent accidental or deliberate additions to certain tallies. The shutters 58 may be removed one at a time and the number of votes for the different candidates noted. Afterward the registers may be set back to zero and the base replaced within the frame.

Having now particularly described and ascertained the nature of our said invention, what we claim, and desire to secure by Letters Patent, is—

1. As an improvement in automatic voting-machines, the combination of the following elements: a base, a plurality of shafts thereon, each intermediarily interrupted to form two parts, keys mounted on both parts, and an oscillating crank for each shaft, the said crank being capable of engaging with either or both shaft parts, substantially as set forth.

2. As an improvement in automatic voting-machines, the combination of the following elements: a base, a plurality of shafts thereon, keys fulcrumed on said shafts, a register carried by each key, means for oscillating said shafts and depressing the keys thereon, and connections between said keys and shafts to allow of a key being depressed without oscillating its supporting-shaft, substantially as set forth.

3. As an improvement in automatic voting-machines, the combination of the following elements: a base, a plurality of shafts thereon, keys fulcrumed on said shafts, a register carried by each key, cranks for oscillating said shafts and depressing the keys thereon, and connections between said keys and shafts to allow of a key being depressed without oscillating its supporting-shaft, substantially as set forth.

4. As an improvement in automatic voting-machines, the combination of the following elements: a base, a plurality of shafts thereon, keys fulcrumed on said shafts, a register carried by each key, means for oscillating said shafts and depressing the keys thereon, and pawl-and-ratchet connections between said keys and shafts to allow of a key being depressed without oscillating its supporting-shaft, substantially as set forth.

5. As an improvement in automatic voting-machines, the combination of the following elements: a base, a plurality of shafts thereon, keys fulcrumed on said shafts, a register carried by each key, cranks for oscillating said shafts and depressing the keys thereon, and pawl-and-ratchet connections between said keys and shafts to allow of a key being depressed without oscillating its supporting-shaft, substantially as set forth.

6. As an improvement in automatic voting-machines, the combination of the following elements: a base, a plurality of shafts thereon, keys fulcrumed on said shafts in lines at right angles to the shafts, means for oscillating said shafts and depressing the keys thereon, connections between said keys and shafts to allow of a key being depressed without oscillating its supporting-shaft, and connections actuated by the depression of a key to disengage the oscillating connection from all the remaining keys in the same line, substantially as set forth.

7. As an improvement in automatic voting-machines, the combination of the following elements: a base, a plurality of shafts thereon, keys fulcrumed on said shafts in lines at right angles to the shafts, cranks for oscillating said shafts and depressing the keys thereon, connections between said keys and shafts to allow of a key being depressed without oscillating its supporting-shaft, and connections actuated by the depression of a key to disengage the oscillating connection from all the remaining keys in the same line, substantially as set forth.

8. As an improvement in automatic voting-machines, the combination of the following elements: a base, a plurality of shafts thereon, keys fulcrumed on said shafts in lines at right angles to the shafts, means for oscillating said shafts and depressing the keys thereon, pawl-and-ratchet connections between said keys and shafts to allow of a key being depressed without oscillating its supporting-shaft, and connections actuated by the depression of a key to disengage the oscillating connection from all the remaining keys in the same line, substantially as set forth.

9. As an improvement in automatic voting-machines, the combination of the following elements: a base, a plurality of shafts thereon, keys fulcrumed on said shafts in lines at right angles to the shafts, cranks for oscillating said shafts and depressing the keys thereon, pawl-and-ratchet connections between said keys and shafts to allow of a key being depressed without oscillating its supporting-shaft, and connections actuated by the depression of a key to disengage the oscillating connection from all the remaining keys in the same line, substantially as set forth.

10. As an improvement in automatic voting-machines, the combination of the following elements: a base, a plurality of shafts thereon, keys fulcrumed on said shafts in lines at right angles to the shafts, a register carried by each key, means for oscillating said shafts and depressing the keys thereon, connections between said keys and shafts to allow of a key being depressed without oscillating its supporting-shaft, and connections actuated by the depression of a key to disengage the oscillating connection from all the remaining keys in the same line, substantially as set forth.

11. As an improvement in automatic voting-machines, the combination of the following elements: a base, a plurality of shafts thereon, keys fulcrumed on said shafts in lines at right angles to the shafts, a register carried by each key, cranks for oscillating said shafts and depressing the keys thereon, connections between said keys and shafts to allow of a key being depressed without oscillating its supporting-shaft, and connections actuated by the depression of a key to disengage the oscillating connection from all the remaining keys in the same line, substantially as set forth.

12. As an improvement in automatic voting-machines, the combination of the following elements: a base, a plurality of shafts thereon, keys fulcrumed on said shafts in lines at right angles to the shafts, a register carried by each key, means for oscillating said shafts and depressing the keys thereon, pawl-and-ratchet connections between said keys and shafts to allow of a key being depressed without oscillating its supporting-shaft, and connections actuated by the depression of a key to disengage the oscillating connection from all the remaining keys in the same line, substantially as set forth.

13. As an improvement in automatic voting-machines, the combination of the following elements: a base, a plurality of shafts thereon, keys fulcrumed on said shafts in lines at right angles to the shafts, a register carried by each key, cranks for oscillating said shafts and depressing the keys thereon, pawl-and-ratchet connections between said keys and shafts to allow of a key being depressed without oscillating its supporting-shaft, and connections actuated by the depression of a key to disengage the oscillating connection from all the remaining keys in the same line, substantially as set forth.

14. As an improvement in automatic voting-machines, the combination of the following elements: a base, a plurality of shafts thereon, keys fulcrumed on said shafts in lines at right angles to the shafts, means for oscillating said shafts and depressing the keys thereon, connections between the keys and shafts to allow of a key being depressed without oscillating its supporting-shaft, and a pivoted lever actuated by the depression of a key to disengage the oscillating connection from all the remaining keys in the same line, substantially as set forth.

15. As an improvement in automatic voting-machines, the combination of the following elements: a base, a plurality of shafts thereon, keys fulcrumed on said shafts in lines at right angles to the shafts, cranks for oscillating said shafts and depressing the keys thereon, connections between said keys and shafts to allow of a key being depressed without oscillating its supporting-shaft, and a pivoted lever actuated by the depression of a key to disengage the oscillating connection from all the remaining keys in the same line, substantially as set forth.

16. As an improvement in automatic voting-machines, the combination of the following elements: a base, a plurality of shafts thereon, keys fulcrumed on said shafts in lines at right angles to the shafts, means for oscillating said shafts and depressing the keys thereon, pawl-and-ratchet connections between said keys and shafts to allow of a key being depressed without oscillating its supporting-shaft, and a pivoted lever actuated by the depression of a key to disengage the oscillating connection from all the remaining keys in the same line, substantially as set forth.

17. As an improvement in automatic voting-machines, the combination of the following elements: a base, a plurality of shafts thereon, keys fulcrumed on said shafts in lines at right angles to the shafts, cranks for oscillating said shafts and depressing the keys thereon, pawl-and-ratchet connections between said keys and shafts to allow of a shaft being depressed without oscillating its supporting-shaft, and a pivoted lever actuated by the depression of a key to disengage the oscillating connection from all the remaining keys in the same line, substantially as set forth.

18. As an improvement in automatic voting-machines, the combination of the following elements: a base, a plurality of shafts thereon, keys fulcrumed on said shafts in lines at right angles to the shafts, a register carried by each key, means for oscillating said shafts and depressing the keys thereon, connections between said keys and shafts to allow of a key being depressed without oscillating its supporting-shaft, a pivoted lever actuated by the depression of a key to disengage the oscillating connection from all the remaining keys in the same line, substantially as set forth.

19. As an improvement in automatic voting-machines, the combination of the following elements: a base, a plurality of shafts thereon, keys fulcrumed on said shafts in lines at right angles to the shafts, a register carried by each key, cranks for oscillating said shafts and depressing the keys thereon, connections between said keys and shafts to allow of a key being depressed without oscillating its supporting-shaft, and a pivoted lever actuated by the depression of a key to disengage the oscillating connection from all the remaining keys in the same line, substantially as set forth.

20. As an improvement in automatic voting-machines, the combination of the following elements: a base, a plurality of shafts thereon, keys fulcrumed on said shafts in lines at right angles to the shafts, a register carried by each key, means for oscillating said shafts and depressing the keys thereon, pawl-and-ratchet connections between said keys and shafts to allow of a key being depressed without oscillating its supporting-shaft, and a pivoted lever actuated by the depression of a key to disengage the oscillating connection from all the remaining keys in the same line, substantially as set forth.

21. As an improvement in automatic voting-machines, the combination of the following elements: a base, a plurality of shafts thereon, keys fulcrumed on said shafts in lines at right angles to the shafts, a register carried by each key, cranks for oscillating said shafts and depressing the keys thereon, pawl-and-ratchet connections between said keys and shafts to allow of a key being depressed without oscillating its supporting-shaft, and a pivoted lever actuated by the depression of a key to disengage the oscillating connection from all the remaining keys in the same line, substantially as set forth.

22. As an improvement in automatic voting-machines, the combination of the following elements: a base, a plurality of shafts thereon, fixed ways at right angles to said shafts, sliding lock-bars within the ways, keys fulcrumed on said shafts in lines above said ways, means for oscillating said shafts and depressing the keys thereon, connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

23. As an improvement in automatic voting-machines, the combination of the following elements: a base, a plurality of shafts thereon, fixed ways at right angles to said shafts, sliding lock-bars within the ways, keys fulcrumed on said shafts in lines above said ways, cranks for oscillating said shafts and depressing the keys thereon, connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

24. As an improvement in automatic voting-machines, the combination of the following elements: a base, a plurality of shafts thereon, fixed ways at right angles to said shafts, sliding lock-bars within the ways, keys fulcrumed on said shafts in lines above said ways, means for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

25. As an improvement in automatic voting-machines, the combination of the following elements: a base, a plurality of shafts thereon, fixed ways at right angles to said shafts, sliding lock-bars within the ways, keys fulcrumed on said shafts in lines above said ways, cranks for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

26. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, means for oscillating said shafts and depressing the keys thereon, connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

27. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, cranks for oscillating said shafts and depressing the keys thereon, connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

28. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, means for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and connections between said lock-bar and oscillating connection to disengage the same from all the remaining keys in the same line, substantially as set forth.

29. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, cranks for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and connections between said lock-bar and oscillating connection to disengage the same from all remaining keys in the same line, substantially as set forth.

30. As an improvement in automatic voting-machines, the combination of the following elements: a base, a plurality of shafts thereon, fixed ways at right angles to said shafts, sliding lock-bars within the ways, keys fulcrumed on said shafts in lines above said ways, means for oscillating said shafts and depressing the keys thereon, connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

31. As an improvement in automatic voting-machines, the combination of the following elements: a base, a plurality of shafts thereon, fixed ways at right angles to said shafts, sliding lock-bars within the ways, keys fulcrumed on said shafts in lines above said ways, cranks for oscillating said shafts and depressing the keys thereon, connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

32. As an improvement in automatic voting-machines, the combination of the following elements: a base, a plurality of shafts thereon, fixed ways at right angles to said shafts, sliding lock-bars within the ways, keys fulcrumed on said shafts in lines above said ways, means for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

33. As an improvement in automatic voting-machines, the combination of the following elements: a base, a plurality of shafts thereon, fixed ways at right angles to said shafts, sliding lock-bars within the ways, keys fulcrumed on said shafts in lines above said ways, cranks for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

34. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, means for oscillating said shafts and depressing the keys thereon, connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

35. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, cranks for oscillating said shafts and depressing the keys thereon, connections between said keys and shafts to allow of a key being depressed without oscillating its supporting-shaft, and connections between said keys and the lock-bars for sliding a bar upon the depression of a key, and a pivoted lever between said lock-bars and oscillating connection to disengage the same from all the remaining keys in the same line, substantially as set forth.

36. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, means for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

37. As an improvement in automatic voting-machines, the combination of the following elements: a base, a plurality of shafts thereon, fixed ways at right angles to said shafts, sliding lock-bars within the ways, keys fulcrumed on said shafts in lines above said ways, a register carried by each key, cranks for oscillating said shafts and depressing the keys thereon, pawl-and-ratchet connections between said keys and shafts to allow of a key being depressed without oscillating its supporting-shaft, and connections between said keys and the lock-bars for sliding a bar upon the depression of a key, and a pivoted lever between said lock-bar and oscillating connection to disengage the same from all the remaining keys in the same line, substantially as set forth.

38. As an improvement in automatic voting-machines, the combination of the following elements: a base, repressible keys fulcrumed thereon, a register carried by each key, and means on the base adapted to engage with and actuate said register by the depression of the key, substantially as set forth.

39. As an improvement in automatic voting-machines, the combination of the following elements: a base, depressible keys fulcrumed thereon, a register carried by each key, a toothed wheel forming a part of said register, and means on the base adapted to engage with and actuate said toothed wheel by the depression of the key, substantially as set forth.

40. As an improvement in automatic voting-machines, the combination of the following elements: a base, depressible keys fulcrumed thereon, a register carried by each key, a toothed wheel forming a part of said register, and a finger on the base adapted to engage with and actuate said toothed wheel by the depression of the key, substantially as set forth.

41. As an improvement in automatic voting-machines, the combination of the following elements: a base, a line of keys thereon mounted on separate fulcrums, pins carried by said keys, the said pins being characterized by irregular arrangement, and a sliding lock-bar actuated by the depression of a single key to render undepressible the remaining keys in the same line, substantially as set forth.

In testimony whereof we have signed our names to this specification in the presence of two subscribing witnesses.

JOHN B. MAHANA.
WILLIAM P. ELY.

Witnesses:
  LILLIE ROSWELL,
  P. C. KIBBE.